(12) United States Patent
Paterson et al.

(10) Patent No.: US 7,547,352 B2
(45) Date of Patent: Jun. 16, 2009

(54) AIR CLEANER CONDUCTOR SYSTEM

(75) Inventors: Christopher M. Paterson, Biloxi, MS (US); Dennis T. Lamb, Long Beach, MS (US); Jadon Gutierrez, Winston-Salem, NC (US)

(73) Assignee: Oreck Holdings LLC, Cheyenne, WY (US)

( * ) Notice: Subject to any disclaimer, the term of this patent is extended or adjusted under 35 U.S.C. 154(b) by 384 days.

(21) Appl. No.: 11/499,595

(22) Filed: Aug. 4, 2006

(65) Prior Publication Data

US 2008/0028937 A1  Feb. 7, 2008

(51) Int. Cl.
*B03C 3/74* (2006.01)
*B03C 3/86* (2006.01)

(52) U.S. Cl. .................................. 96/39; 96/81; 96/94

(58) Field of Classification Search ............... 96/29–31, 96/39–41, 81, 94
See application file for complete search history.

(56) References Cited

U.S. PATENT DOCUMENTS

| | | | |
|---|---|---|---|
| 2,486,520 A * | 11/1949 | Dahlman | ........................ 96/58 |
| 3,237,363 A | 3/1966 | Gilbertson | |
| 3,504,482 A | 4/1970 | Goettl | |
| 3,513,634 A | 5/1970 | Angonese et al. | |
| 3,626,669 A | 12/1971 | Cardiff | |
| 3,630,000 A | 12/1971 | Mullings | |
| 5,290,343 A * | 3/1994 | Morita et al. | ................... 96/39 |
| 5,628,818 A * | 5/1997 | Smith et al. | .................... 96/30 |
| 6,174,340 B1 | 1/2001 | Hodge | |
| 7,258,715 B2 * | 8/2007 | Cox et al. | ...................... 55/422 |
| 7,332,019 B2 * | 2/2008 | Bias et al. | ....................... 96/15 |
| 7,351,274 B2 * | 4/2008 | Helt et al. | ......................... 95/2 |
| 2006/0016335 A1* | 1/2006 | Cox et al. | ...................... 96/15 |
| 2008/0017027 A1* | 1/2008 | Paterson et al. | ................... 95/2 |

FOREIGN PATENT DOCUMENTS

| | | | | |
|---|---|---|---|---|
| GB | 1102530 A | | 2/1968 | |
| JP | 4-354550 A | * | 12/1992 | .................... 96/30 |

* cited by examiner

*Primary Examiner*—Richard L Chiesa
(74) *Attorney, Agent, or Firm*—Winston & Strawn LLP; Richard P. Gilly

(57) ABSTRACT

An air cleaner conductor system is provided according to an embodiment of the invention. The air cleaner conductor system includes an electrostatic precipitator assembly, a chassis including an electrostatic precipitator receptacle and a power supply, and two or more electrical contacts located in the electrostatic precipitator receptacle and coupled to the power supply. The two or more electrical contacts extend at least partially into the electrostatic precipitator receptacle. The electrostatic precipitator assembly comes into contact with the two or more electrical contacts when the electrostatic precipitator assembly is substantially fully inserted into position in the electrostatic precipitator receptacle.

36 Claims, 13 Drawing Sheets

AIR CLEANER CONDUCTOR SYSTEM

TECHNICAL FIELD

The present invention relates to an air cleaner conductor system.

BACKGROUND OF THE INVENTION

Air cleaners and purifiers are widely used for removing foreign substances from the air. The foreign substances can include pollen, dander, smoke, pollutants, dust, etc. In addition, an air cleaner can be used to circulate room air. An air cleaner can be used in many settings, including at home, in offices, workrooms, etc.

One type of air cleaner is an electrostatic precipitator. An electrostatic precipitator operates by creating a high-voltage electrical field, typically in excess of 5,000 volts. Dirt and debris in the air becomes ionized when it is brought into this high voltage electrical field by an airflow. Charged plates or electrodes in the electrostatic precipitator air cleaner, such as positive and negative plates or positive and grounded plates, create the electrical field and one of the electrode polarities attracts the ionized dirt and debris. Periodically, the electrostatic precipitator can be removed and cleaned. Because the electrostatic precipitator comprises electrodes or plates through which airflow can easily and quickly pass, only a low amount of energy is required to provide airflow through the electrostatic precipitator. As a result, foreign objects in the air can be efficiently and effectively removed without the need for a mechanical filter element.

In one prior art air cleaner, an electrostatic precipitator element is connected to a power supply by some manner of wiring harness. Alternatively, the prior art can connect an electrostatic precipitator element to a power supply by some manner of conductive side rails or contacts extending from the electrostatic precipitator element.

The prior art has drawbacks. The high voltage employed in a typical electrostatic precipitator element presents a significant danger of shock or electrocution. The prior art does not provide an electrical conductor system that minimizes risk of contact with high voltage components by a person. The prior art does not provide a conductor system that is easy and efficient to install or remove, while also minimizing the risk of contact with high voltage components. Some prior art devices feature side insertion of an electrostatic precipitator element, wherein a person's hand can grip a portion of the electrostatic precipitator element as the electrostatic precipitator element is slid sideways into a frame, and therefore the hand can be between the electrostatic precipitator element and the power supply contacts or wires.

SUMMARY OF THE INVENTION

An air cleaner conductor system is provided according to an embodiment of the invention. The air cleaner conductor system comprises an electrostatic precipitator assembly, a chassis including an electrostatic precipitator receptacle and a power supply, and two or more electrical contacts located in the electrostatic precipitator receptacle and coupled to the power supply. The two or more electrical contacts extend at least partially into the electrostatic precipitator receptacle. The electrostatic precipitator assembly comes into contact with the two or more electrical contacts when the electrostatic precipitator assembly is substantially fully inserted into position in the electrostatic precipitator receptacle.

An air cleaner conductor system is provided according to an embodiment of the invention. The air cleaner conductor system comprises an electrostatic precipitator assembly including a pre-ionizer, a chassis including an electrostatic precipitator receptacle and a power supply, and three or more electrical contacts located in the electrostatic precipitator receptacle and coupled to the power supply. The three or more electrical contacts extend at least partially into the electrostatic precipitator receptacle. The electrostatic precipitator assembly comes into contact with the three or more electrical contacts when the electrostatic precipitator assembly is substantially fully inserted into position in the electrostatic precipitator receptacle.

An air cleaner conductor system is provided according to an embodiment of the invention. The air cleaner conductor system comprises an electrostatic precipitator assembly comprising two or more conductor regions and a chassis including an electrostatic precipitator receptacle and a power supply. The electrostatic precipitator receptacle includes one or more sidewalls, an opening, and a back surface opposite the opening. The air cleaner conductor system further comprises an electrical supply pad. The electrical supply pad is retained in the electrostatic precipitator receptacle at a predetermined location on the back surface. The air cleaner conductor system further comprises two or more electrical contacts held in the electrical supply pad and extending at least partially from the electrical supply pad and into the electrostatic precipitator receptacle. The two or more conductor regions of the electrostatic precipitator assembly come into contact with the two or more electrical contacts when the electrostatic precipitator assembly is substantially fully inserted into position in the electrostatic precipitator receptacle. The air cleaner conductor system further comprises a wiring harness extending to the electrical supply pad. Two or more corresponding wires of the wiring harness couple the two or more electrical contacts to the power supply.

BRIEF DESCRIPTION OF THE DRAWINGS

The same reference number represents the same element on all drawings. It should be noted that the drawings are not necessarily to scale.

DETAILED DESCRIPTION OF THE INVENTION

FIGS. 1-13 and the following descriptions depict specific embodiments to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will also appreciate that the features described below can be combined in various ways to form multiple variations of the invention. As a result, the invention is not limited to the specific embodiments described below, but only by the claims and their equivalents.

Figure 1:
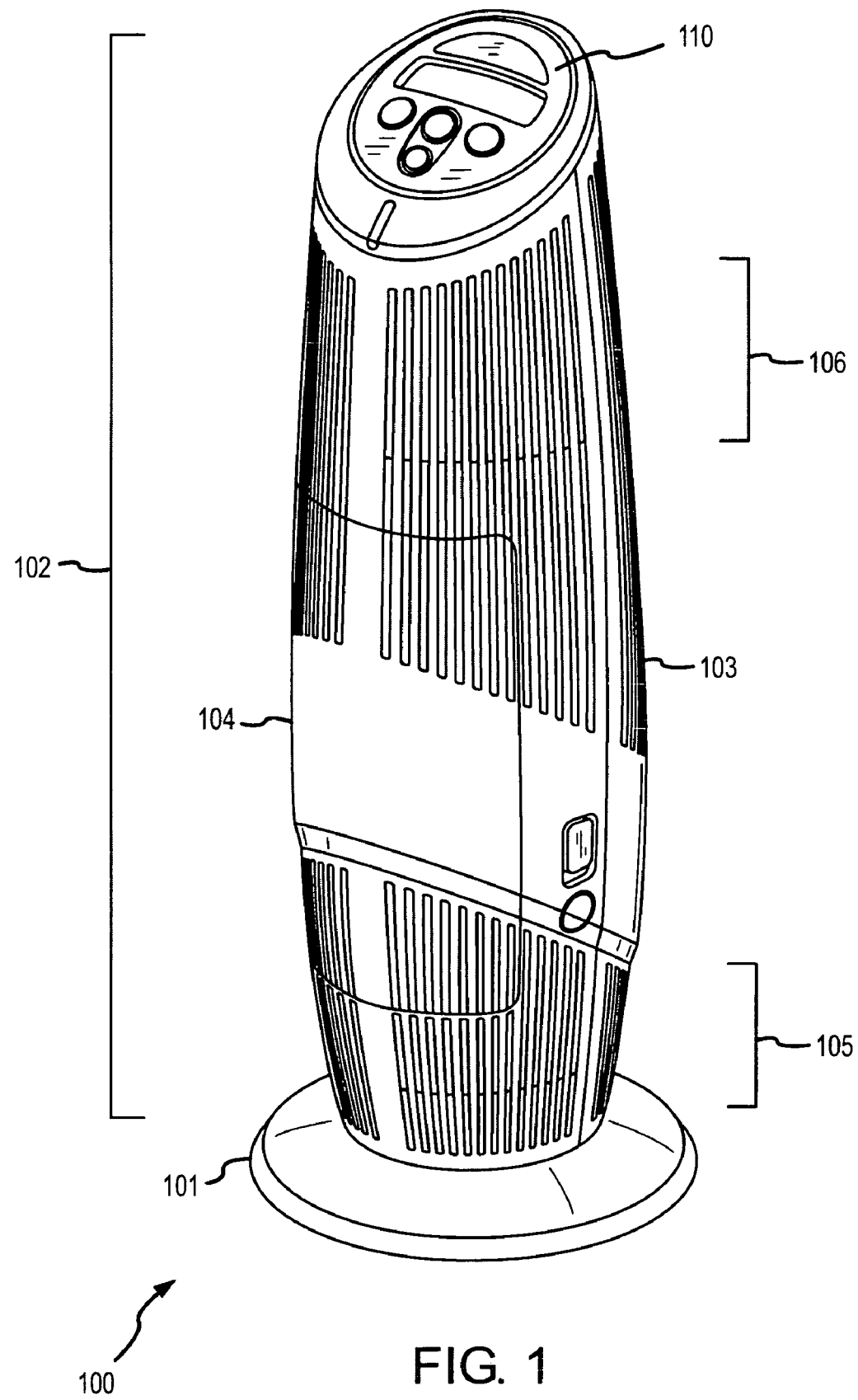
FIG. 1 shows a tower air cleaner according to an embodiment of the invention.

FIG. 1 shows a tower air cleaner 100 according to an embodiment of the invention. The tower air cleaner 100 includes a base portion 101 and a tower portion 102. The tower portion 102 can be generally vertically positioned and elongate in shape. In one embodiment, the tower portion 102 can be substantially cylindrical in shape. The tower portion 102 includes a shell 103, one or more doors 104, and a control panel 110. The tower portion 102 further includes an air inlet 105 and an air outlet 106. Air is drawn in through the air inlet 105, is cleaned inside the tower portion 102, and the cleaned air is exhausted from the air outlet 106. However, it should be understood that the air cleaner 100 can comprise other shapes, configurations, and designs, and the tower configuration is shown merely for illustration.

The air inlet 105 is shown as being at the lower end of the tower portion 102. However, it should be understood that alternatively the relative positions of the air inlet 105 and the air outlet 106 could be interchanged.

Figure 2:
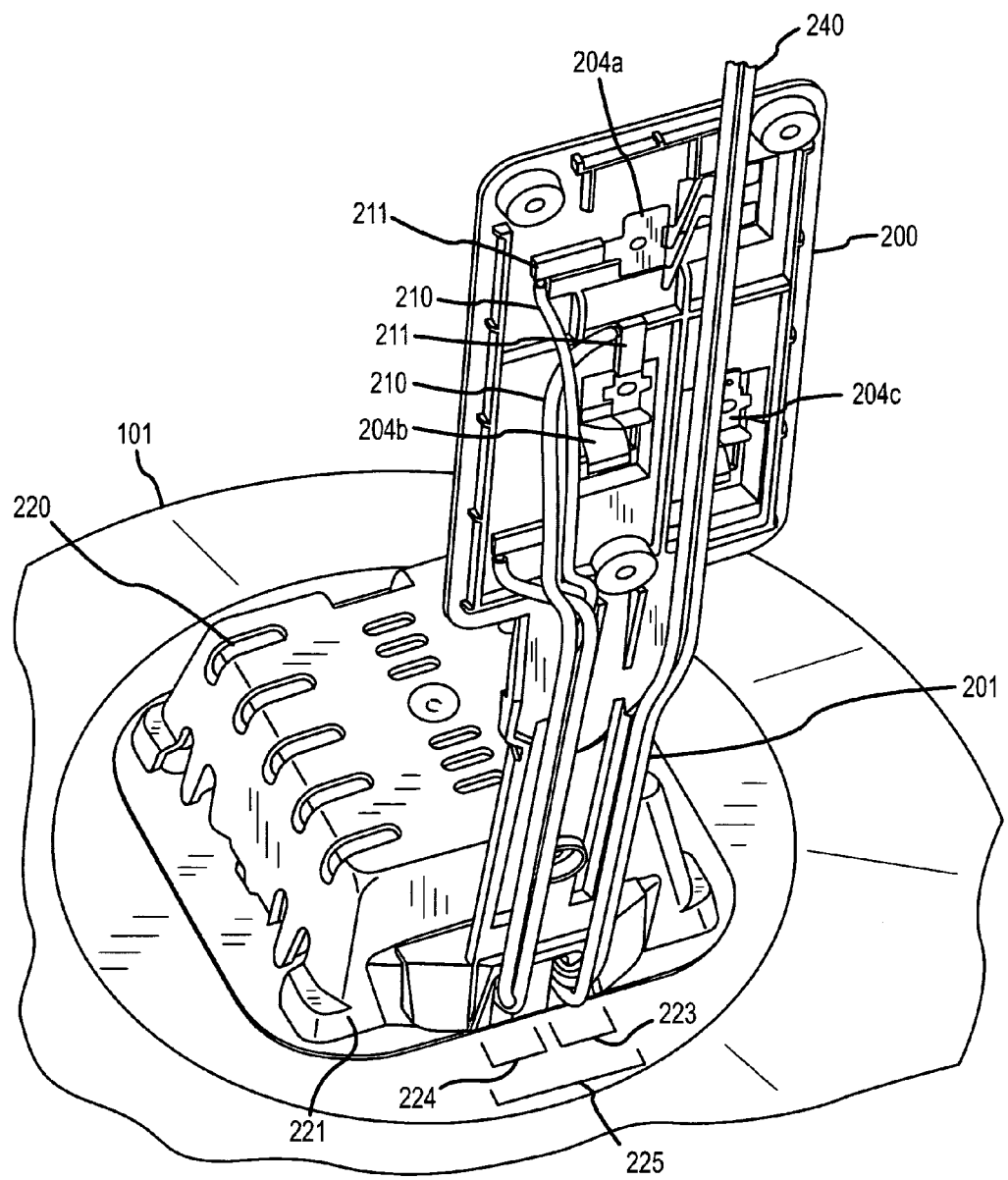
FIG. 2 shows an electrical supply pad according to an embodiment of the invention.

FIG. 2 shows an electrical supply pad 200 according to an embodiment of the invention. The electrical supply pad 200 can include a leg portion 201 and two or more electrical contacts 204. In the embodiment shown, the electrical supply pad 200 includes three electrical contacts 204. The electrical contacts 204 are discussed and shown in detail in FIG. 3. However, the number of contacts can be varied.

Each electrical contact 204 is connected to a corresponding wire 210 by a wire connector 211. The wires 210 can extend from a transformer 220 in one embodiment (shown beneath the transformer shell 221), wherein the voltage level at each electrical contact 204 is determined by the transformer 220.

Each electrical contact 204 can provide a unique voltage potential. For example, the electrical contacts 204 can comprise a ground electrical contact 204a, a precipitator electrical contact 204b, and a pre-ionizer electrical contact 204c. In one embodiment, the electrical supply pad 200 delivers a precipitator voltage level through the precipitator electrical contact 204b and delivers a pre-ionizer voltage level through a pre-ionizer electrical contact 204c. The ground electrical contact 204a provides an electrical ground potential.

The leg portion 201 of the electrical supply pad 200 in one embodiment attaches to the base portion 101 of the air cleaner 100 or attaches to a transformer shell 221 of the base portion 101. The leg portion 201 can attach through any manner of fastener(s), including a snap or friction fit, one or more retainer devices, one or more fasteners, etc. The leg portion 201 can include a cover that affixes to the leg portion 201 (see FIG. 5). The leg portion 201 further comprises a wiring channel 225 that accepts a wiring harness 240. The wiring channel 225 in one embodiment includes two channel portions, wherein a first channel portion 223 receives low voltage wires and a second channel portion 224 receives high voltage wires of the wiring harness 240.

Figure 3:
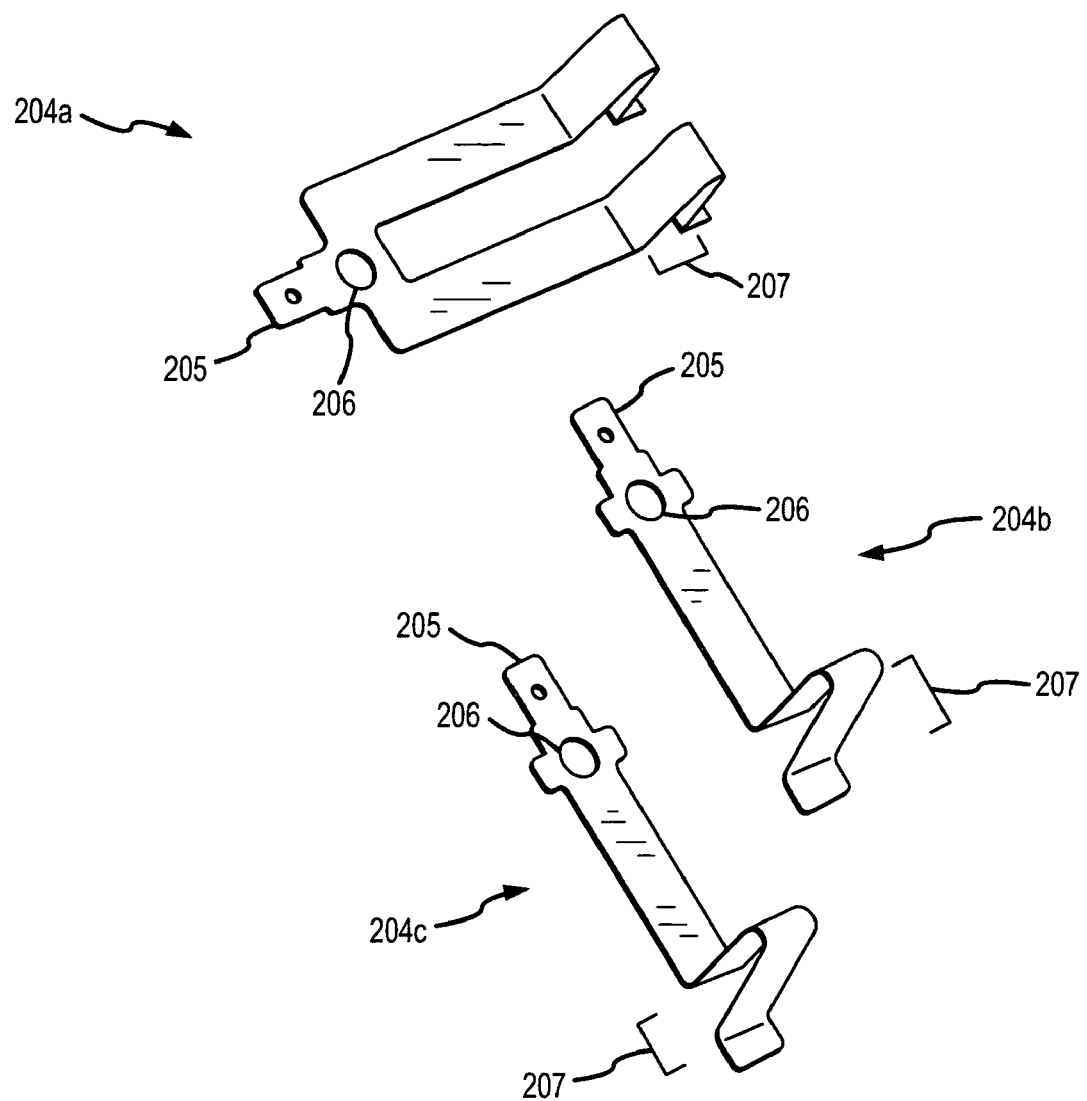
FIG. 3 shows the ground electrical contact, the precipitator electrical contact, and the pre-ionizer electrical contact.

FIG. 3 shows the ground electrical contact 204a, the precipitator electrical contact 204b, and the pre-ionizer electrical contact 204c. Each electrical contact 204 can include a connector tang 205 that mates to a wire connector 211 and a contact bump 207 that comes into contact with conductor regions 610-612 of an electrostatic precipitator assembly 600 (see FIG. 6 and the accompanying discussion). Alternatively, the connector tang 205 can be directly affixed to a corresponding wire, such as by soldering, for example. Each electrical contact 204 can further include a fastener aperture 206 that receives a fastener (not shown). The fastener passes through the fastener aperture 206 and affixes to a fastener boss formed on the electrical supply pad 200 (not shown), thereby affixing the electrical contact 204 to the electrical supply pad 200 in a removable or permanent fashion.

It should be noted that the ground electrical contact 204a can include two legs. The two legs offer a redundancy of contact, wherein at least one contact leg will likely contact the corresponding ground region 610 of the electrostatic precipitator assembly 600.

Figure 4:
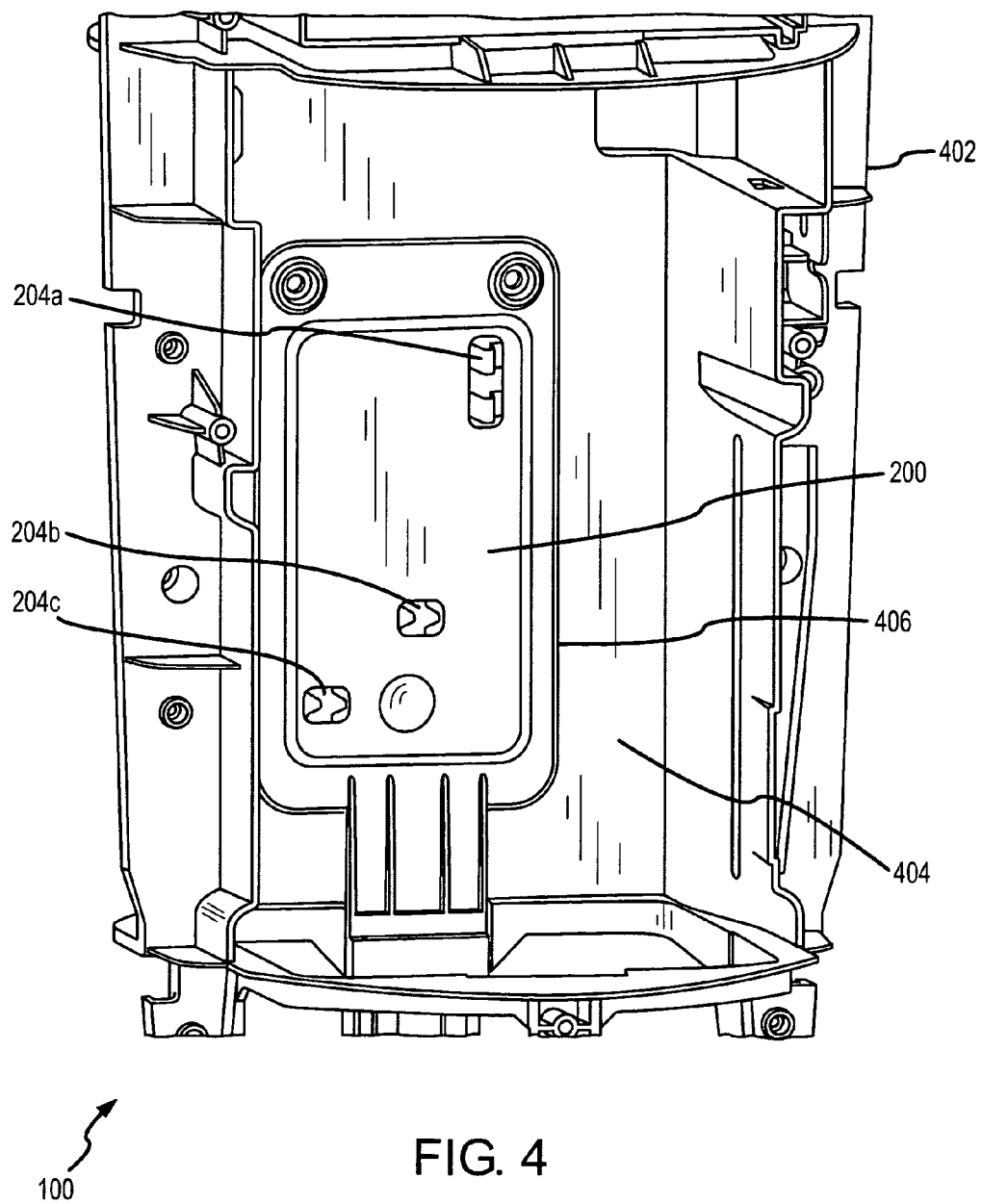
FIG. 4 shows the electrical supply pad assembled to an air cleaner chassis according to an embodiment of the invention.

FIG. 4 shows an electrostatic precipitator receptacle 404 according to an embodiment of the invention. The electrostatic precipitator receptacle 404 includes one or more sidewalls, an opening, and a back surface opposite the opening and with the two or more electrical contacts 204 being located on the back surface of the electrostatic precipitator receptacle 404. In the figure, the electrical supply pad 200 is assembled to the air cleaner chassis 402 in a pad aperture 406. It can be seen from this figure that the contact bumps 207 of the electrical contacts 204 extend at least partially into the electrostatic precipitator receptacle 404.

Figure 5:
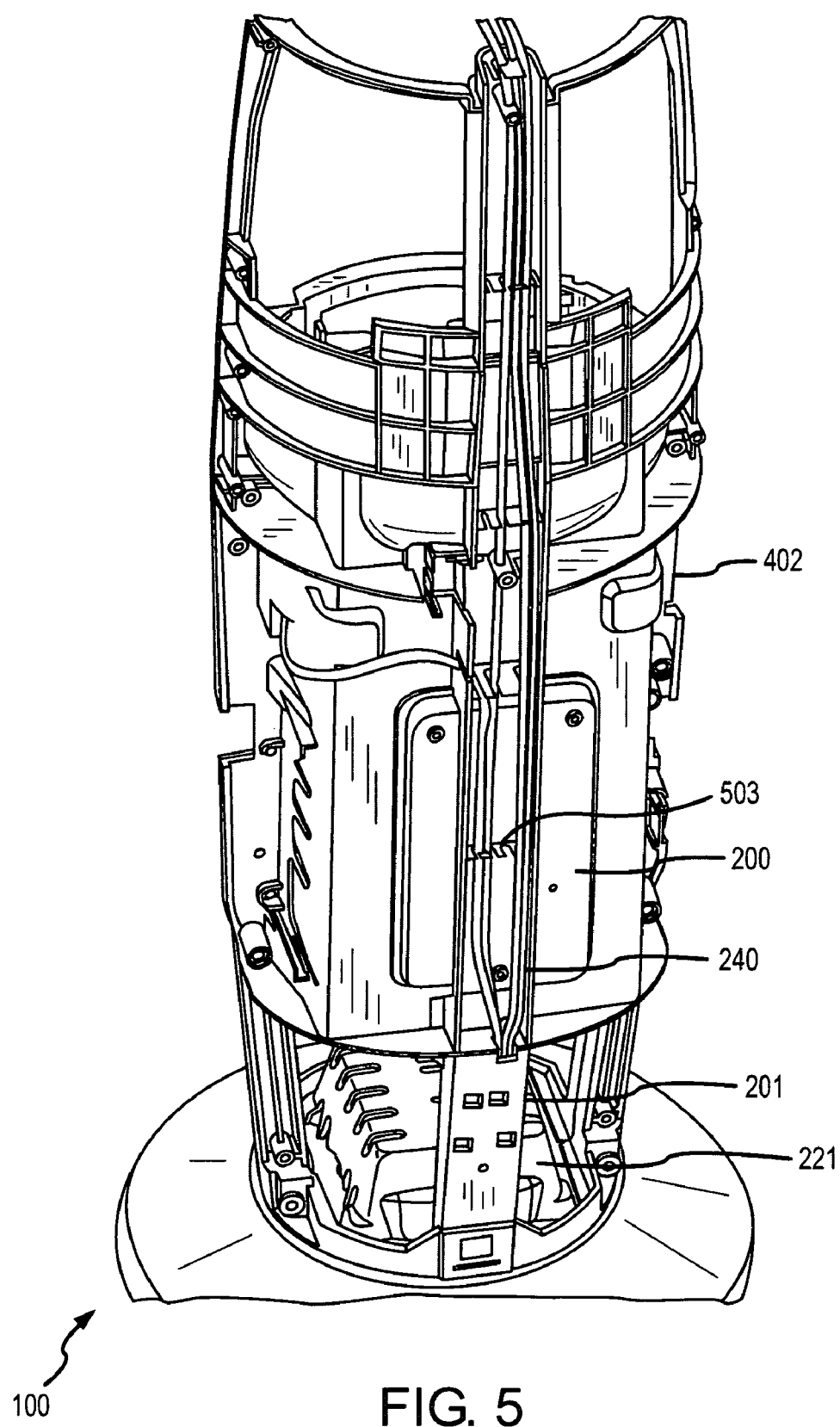
FIG. 5 is a back view of the air cleaner chassis according to an embodiment of the invention.

FIG. 5 is a back view of the air cleaner chassis 402 according to an embodiment of the invention. The back of the electrical supply pad 200 can include one or more clips 503 that receive and hold wires of a wiring harness 240. The wiring harness 240 can include the wires 210 that connect to the electrical contacts 204 (see FIG. 2). The wiring harness 240 in the embodiment shown extends between the transformer 220 (beneath the transformer shell 221) to the control panel 110 (see FIG. 1).

Figure 6:
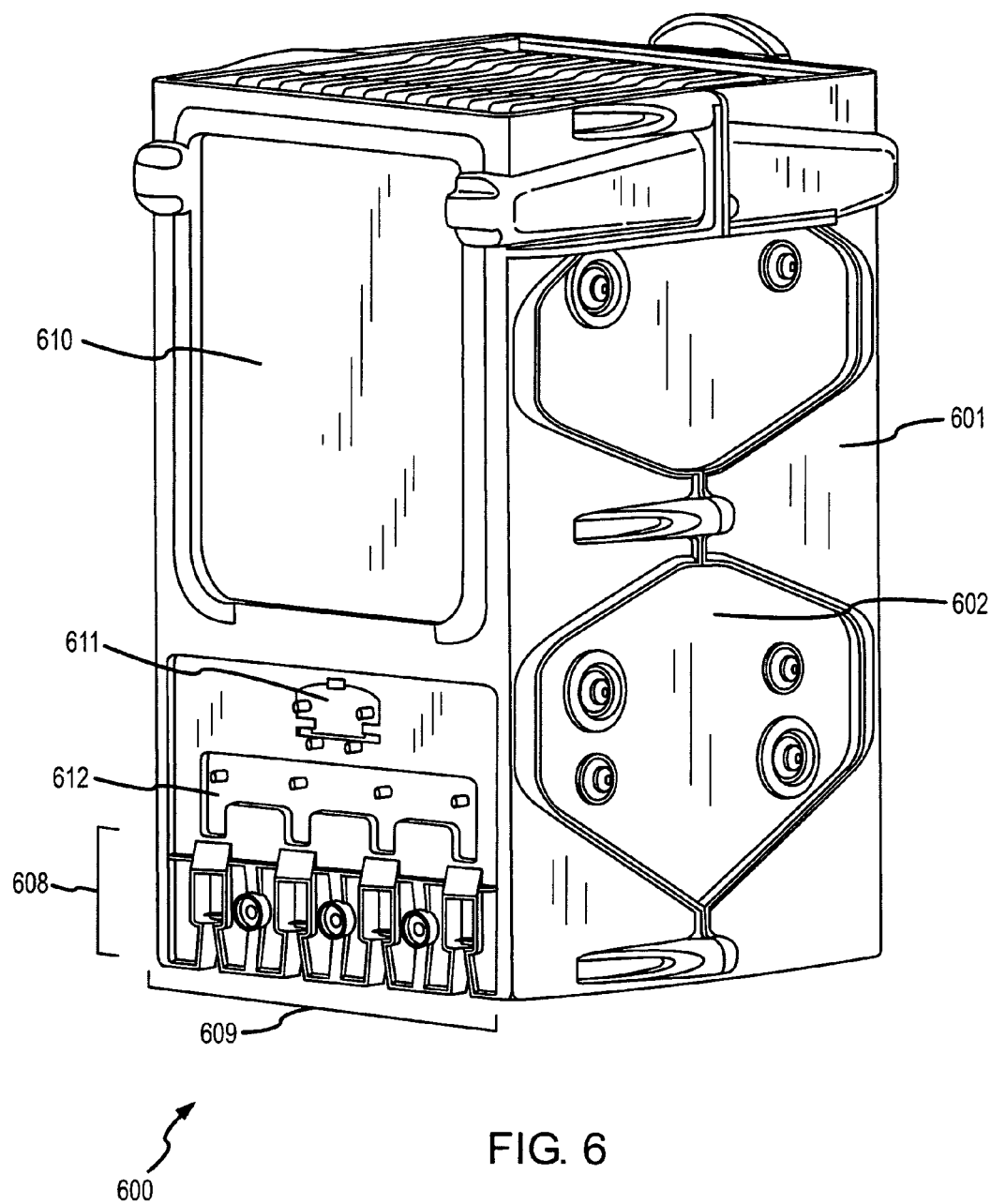
FIG. 6 shows an electrostatic precipitator assembly according to an embodiment of the invention.

FIG. 6 shows an electrostatic precipitator assembly 600 according to an embodiment of the invention. The electrostatic precipitator assembly 600 includes a frame 601 and an electrostatic precipitator cell 602 within the frame 601. The frame 601 can be formed of some manner of electrical insulator material. The electrostatic precipitator assembly 600 comprises two or more side surfaces, a front side including a handle 806 (see FIG. 8), a back side 609 opposite the front side, and two or more conductor regions on the back side, such as the conductor regions 610-612, for example. The electrostatic precipitator cell 602 can comprise a plurality of grounded and charged plates, and can further comprise a pre-ionizer positioned in an inflow region 608 of the electrostatic precipitator cell 602.

The electrostatic precipitator assembly 600 includes a ground conductor region 610 and a precipitator voltage conductor region 611. The electrostatic precipitator assembly 600 can further include a pre-ionizer voltage conductor region 612. The ground conductor region 610 comprises a surface portion of electrically grounded components of the electrostatic precipitator cell 602. The precipitator voltage conductor region 611 comprises a surface portion that is electrically connected to charge plates of the electrostatic precipitator cell 602 and that is placed at a first voltage potential during operation. The pre-ionizer voltage conductor region 612 comprises a surface portion that is electrically connected to corona charge elements (such as corona wires, for example) of a pre-ionizer component of the electrostatic precipitator cell 602, and is placed at a second voltage potential during operation. The first and second voltage potentials can be the same or different. Therefore, when the electrical contacts 204 of the electrical supply pad 200 comes into contact with these conductor regions 610-612, appropriate voltages are supplied to the electrostatic precipitator cell 602. Because each conductor region is isolated from the others and is surrounded by insulating portions of the frame 601, unwanted arcing is thereby minimized.

Figure 7:
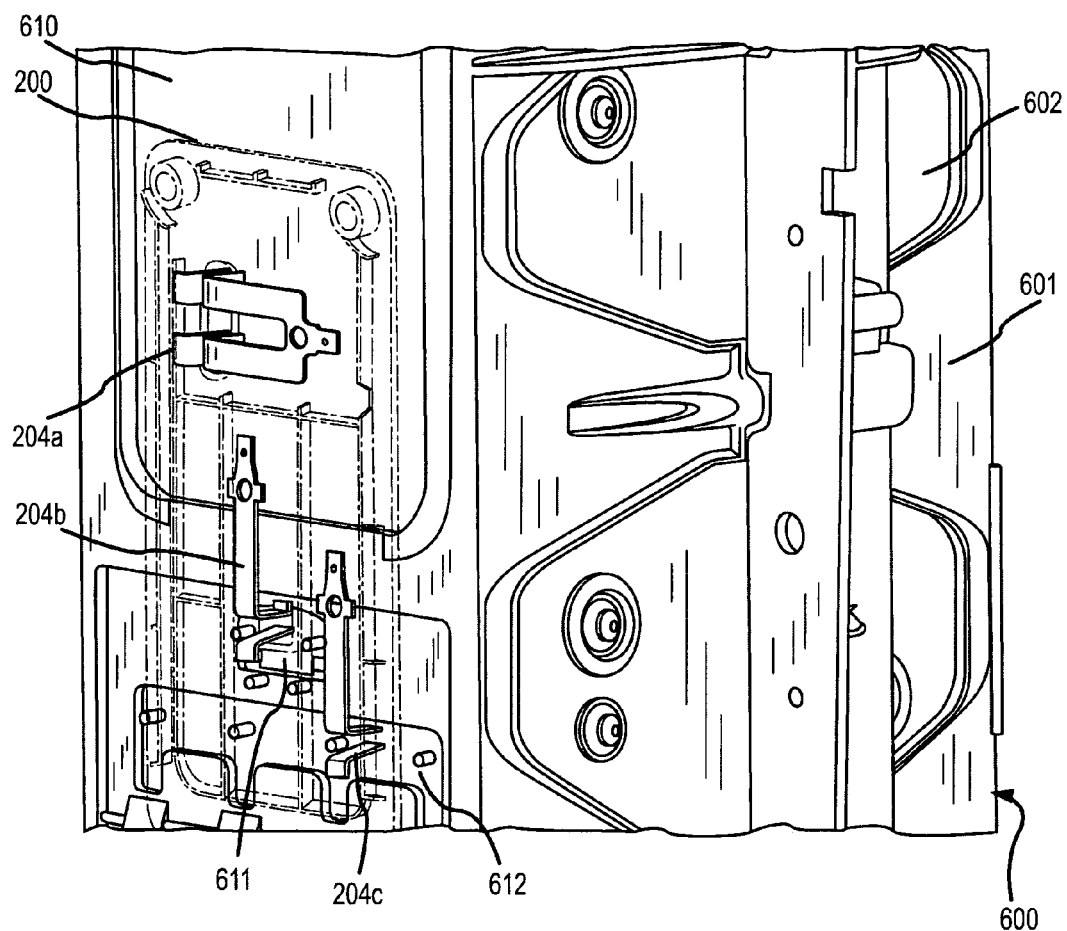
FIG. 7 shows the electrical supply pad in contact with the electrostatic precipitator assembly according to an embodiment of the invention.

FIG. 7 shows the electrical supply pad 200 in contact with the electrostatic precipitator assembly 600 according to an embodiment of the invention. The electrostatic precipitator cell 602 contacts the electrical contacts 204a-c when the electrostatic precipitator cell 602 is substantially fully inserted into position in the electrostatic precipitator receptacle 404. More specifically, the ground electrical contact 204a contacts the ground conductor region 610 in order to place a ground voltage potential on the ground conductor region 610. The precipitator electrical contact 204b contacts the precipitator voltage conductor region 611 in order to place a precipitator voltage potential on the precipitator voltage conductor region 611 (not visible in this figure, see FIG. 6). The pre-ionizer electrical contact 204c contacts the pre-ionizer voltage conductor region 612 in order to place a pre-ionizer voltage potential on the pre-ionizer voltage conductor region 612. The pre-ionizer voltage potential can be the same or different from the precipitator voltage potential. Removal of the electrostatic precipitator assembly 600 from the electrostatic precipitator receptacle 404 breaks electrical contact substantially upon initiation of removal of the electrostatic precipitator assembly 600.

Figure 8:
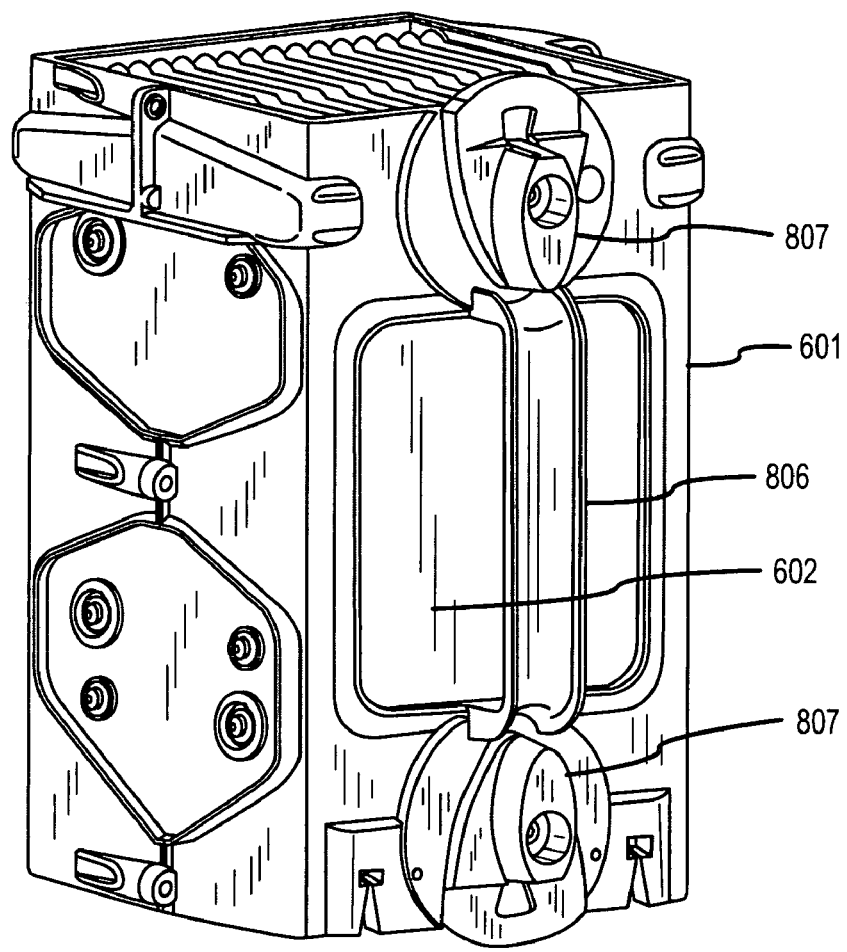
FIG. 8 shows the electrostatic precipitator assembly fully inserted into the electrostatic precipitator receptacle of the air cleaner chassis.

FIG. 8 shows the electrostatic precipitator assembly 600 according to an embodiment of the invention. In the embodiment shown, the electrostatic precipitator assembly 600 includes the electrostatic precipitator cell 602 held in the frame 601, with the frame 601 including a handle 806 and one or more retainer devices 807. In one embodiment, the one or more retainer devices 807 comprise one or more rotatable retainer devices 807. The handle 806 can be grasped and used to insert and remove the electrostatic precipitator assembly 600 from the air cleaner 100. The one or more retainer devices 807 can removably affix the electrostatic precipitator assembly 600 in an electrostatic precipitator receptacle 404 by engaging the air cleaner chassis 402 (see FIG. 9 and the accompanying discussion). Consequently, the electrostatic precipitator assembly 600 cannot vibrate or otherwise move out of position in the electrostatic precipitator receptacle 404. Therefore, a person has to disengage the one or more retainer devices 807 in order to remove the electrostatic precipitator assembly 600.

Removal of the electrostatic precipitator assembly 600 from the electrostatic precipitator receptacle 404 breaks electrical contact substantially upon initiation of the removal. The breaking of electrical contact occurs substantially immediately after a person releases the one or more retainer devices 807 and pulls on the handle 806. Because the electrical contact is quickly broken when removal starts, there is no danger of electrocution or electrical shock to the person removing the electrostatic precipitator assembly 600. In addition, the outer surface of the electrostatic precipitator cell 602 underneath the handle 806 can comprise a grounded surface, wherein no high-voltage portions of the electrostatic precipitator assembly 600 are exposed to touch, even when the front of the electrostatic precipitator assembly 600 is exposed, as in this figure.

Figure 9:
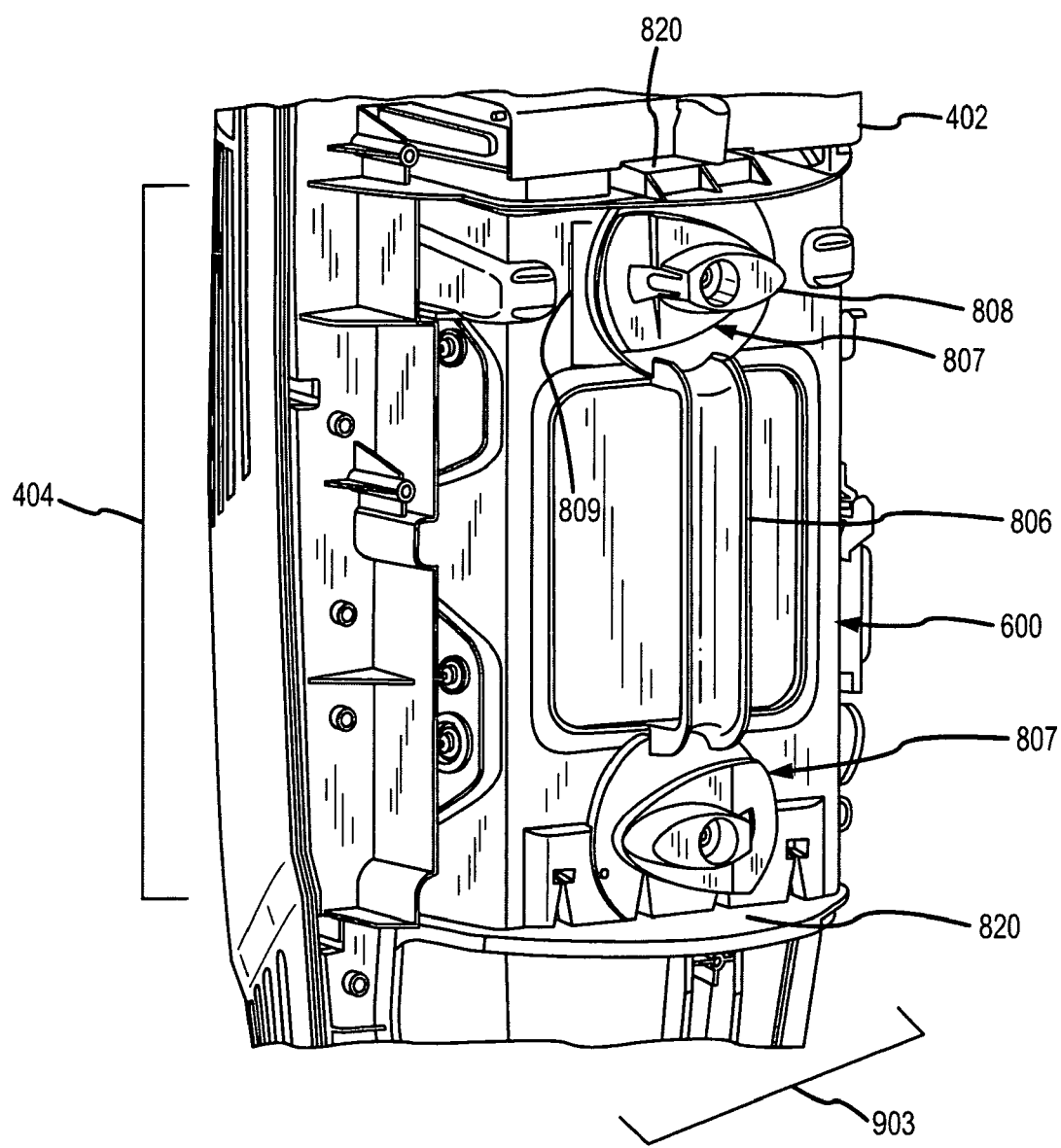
FIG. 9 shows a partially assembled air cleaner according to an embodiment of the invention.

FIG. 9 shows a partially assembled air cleaner 100 according to an embodiment of the invention. In this figure, the electrostatic precipitator assembly 600 is fully inserted into the air cleaner chassis 402 and fits into the electrostatic precipitator receptacle 404. The handle 806 allows the electrostatic precipitator assembly 600 to be easily inserted and removed from the electrostatic precipitator receptacle 404.

The air cleaner 100 can include a front region 903, wherein the electrostatic precipitator assembly 600 is accessed and loaded through the front region 903. Therefore, the electrostatic precipitator assembly 600 can be located directly behind a door 104 of the air cleaner 100 (see FIG. 1).

The one or more retainer devices 807 are rotatably attached to the frame 601, such as by fastener devices, for example. The one or more retainer devices 807 include a handle portion 808 and a substantially arcuate wedge portion 809. The handle portion 808 can be used to rotate the retainer device 807. The wedge portion 809 fits into a corresponding aperture 820 of one or more apertures 820 in the air cleaner chassis 402. When the one or more retainer devices 807 are rotated in order to engage the one or more apertures 820 of the air cleaner chassis 402, the electrostatic precipitator assembly 600 is firmly held in the electrostatic precipitator receptacle 404.

Figure 10:
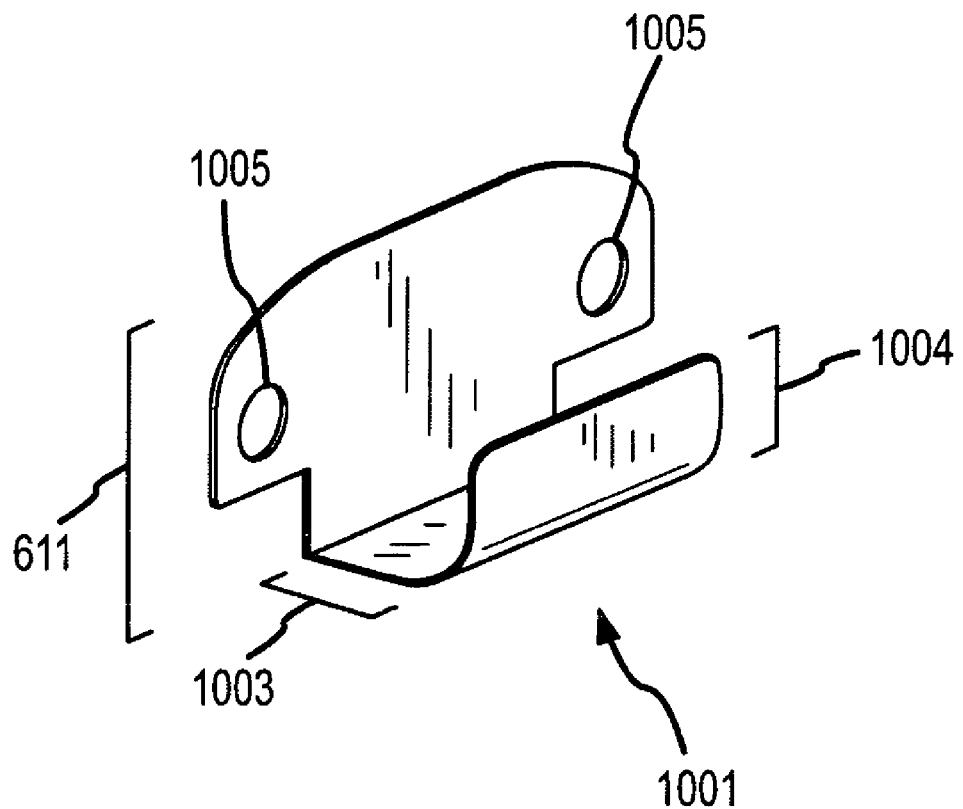
FIG. 10 shows a precipitator contact plate according to an embodiment of the invention.

FIG. 10 shows a precipitator contact plate 1001 according to an embodiment of the invention. The precipitator contact plate 1001 provides an electrical contact member between charge plates 1212 of the electrostatic precipitator cell 603 and the electrical supply pad 200. In one embodiment, the precipitator contact plate 1001 comprises the precipitator voltage conductor region 611 that is positioned on an exterior of the frame 601 (see FIG. 12), a through portion 1003 that extends through the frame 601, and a cell contact portion 1004 that contacts one or more charge plates of the electrostatic precipitator cell 602. In addition, the precipitator contact plate 1001 can include one or more alignment holes 1005 that fit over one or more corresponding alignment projections 1204 of the frame 601 (see FIG. 12).

Figure 11:
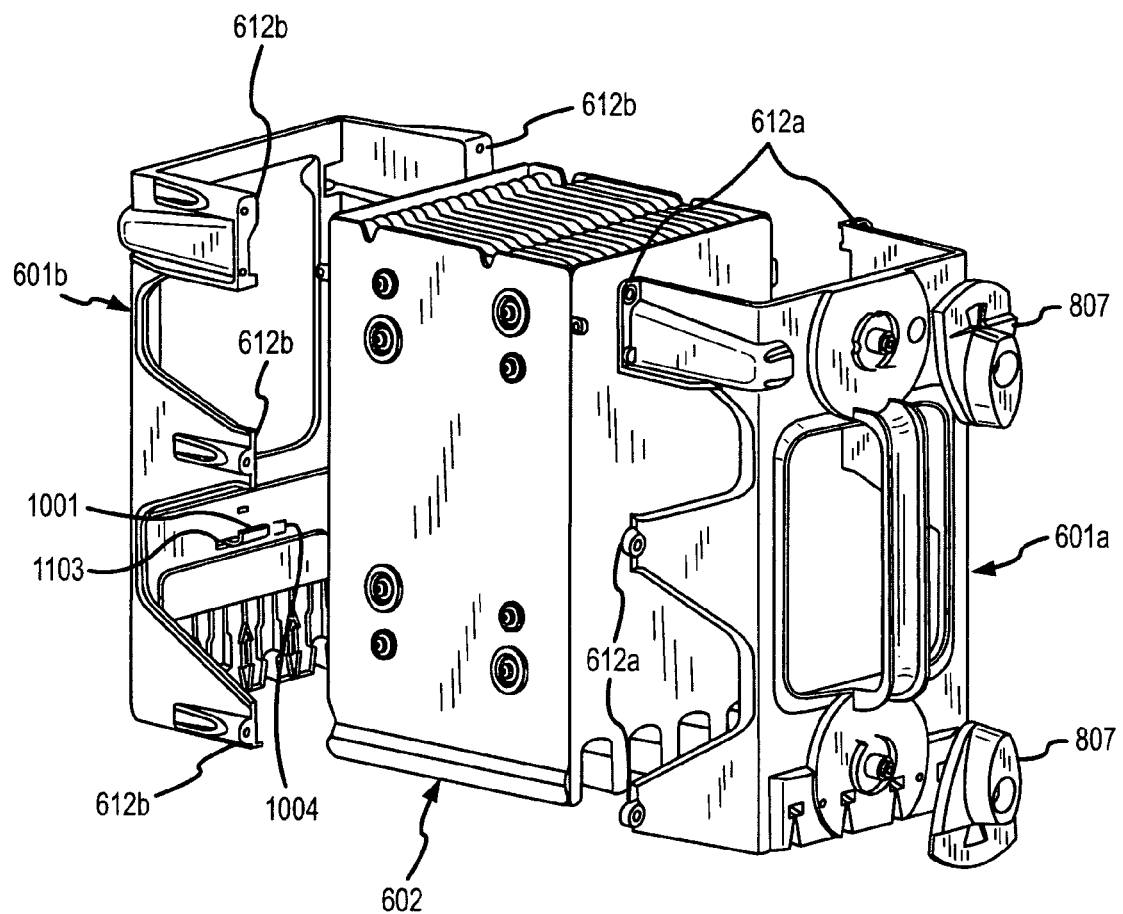
FIG. 11 is an exploded view of the electrostatic precipitator assembly that shows the electrostatic precipitator cell, the frame, and the contact plate.

FIG. 11 is an exploded view of the electrostatic precipitator assembly 600 that shows the electrostatic precipitator cell 602, the frame 601, and the contact plate 1001. The frame 601 in the embodiment shown comprises two frame portions 601a and 601b. The frame portions 601a and 601b can include assembly ears 612a and 612b that can be used to join together the frame portions 601a and 601b using fasteners (not shown). The contact plate 1001 extends through a contact plate opening 1103 in the frame portion 601b. As a result, the cell contact portion 1004 extends inside the frame portion 601b. The contact plate 1001 conducts electricity from an exterior surface of the frame 601 to the charge plates 1212 of the electrostatic precipitator cell 602 (see FIG. 12).

Figure 12:
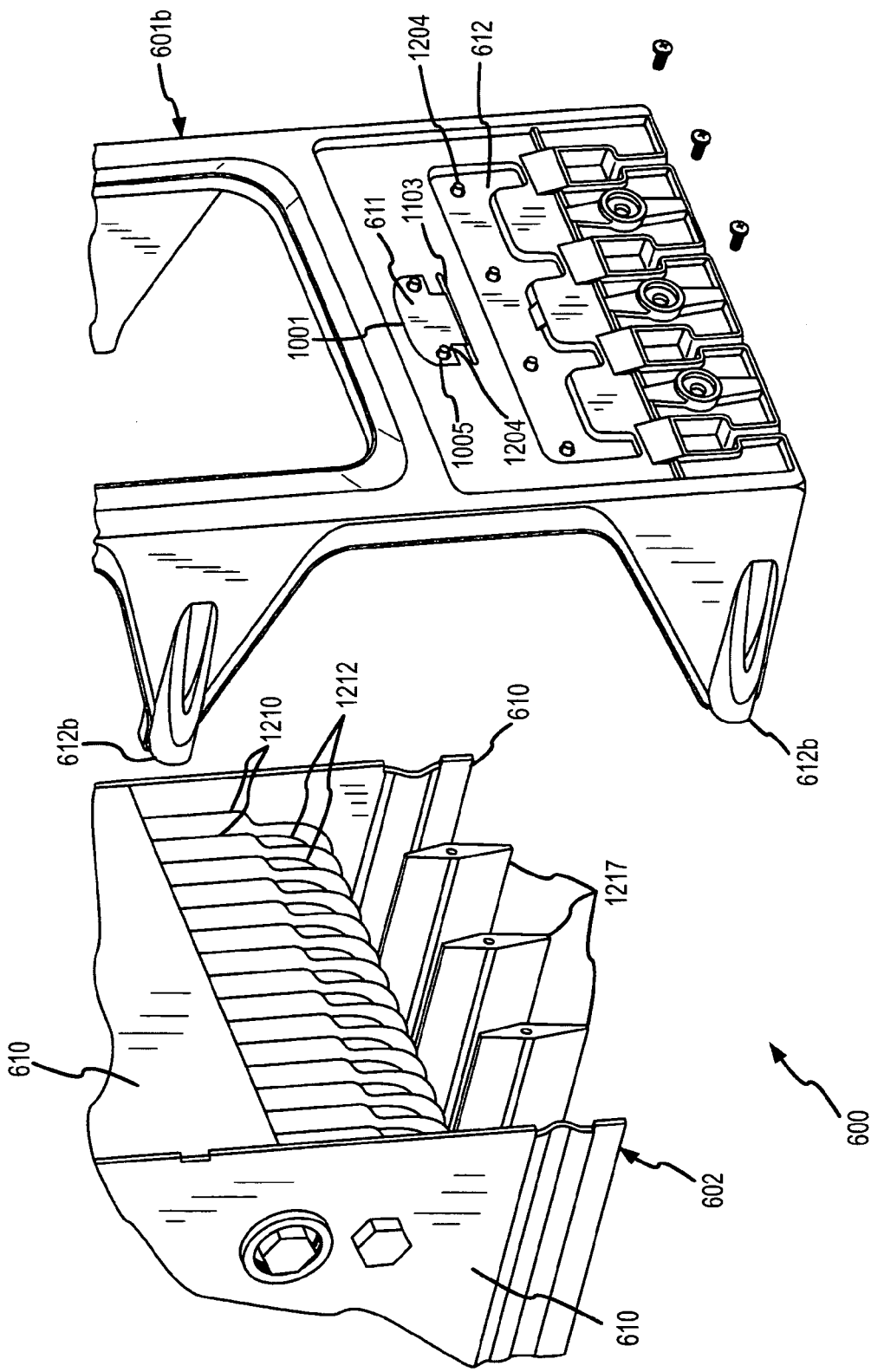
FIG. 12 shows the precipitator contact plate in relation to a plurality of charge plates.

FIG. 12 shows the precipitator contact plate 1001 in relation to a plurality of charge plates 1212. The electrostatic precipitator cell 602 further comprises a plurality of collection plates 1210, with the plurality of charge plates 1212 being interleaved between the plurality of collection plates 1210. The charge plates 1212 extend out past the collection plates 1210. It can be seen from the figure that when the frame portion 601b is assembled to the electrostatic precipitator cell 602, the precipitator contact plate 1001 will contact one or more of the charge plates 1212. In this manner, contact with the precipitator contact plate 1001 will create an electrical connection to the plurality of charge plates 1212.

In addition, this figure also shows corona ground elements 1217. Corona charge elements (not shown), such as corona wires, for example, are positioned between the corona ground elements. The corona charge elements attach to a charge element retaining member that includes the pre-ionizer conductor region 612. As a result, the corona charge elements receive a pre-ionizer voltage through the pre-ionizer conductor region 612.

Figure 13:
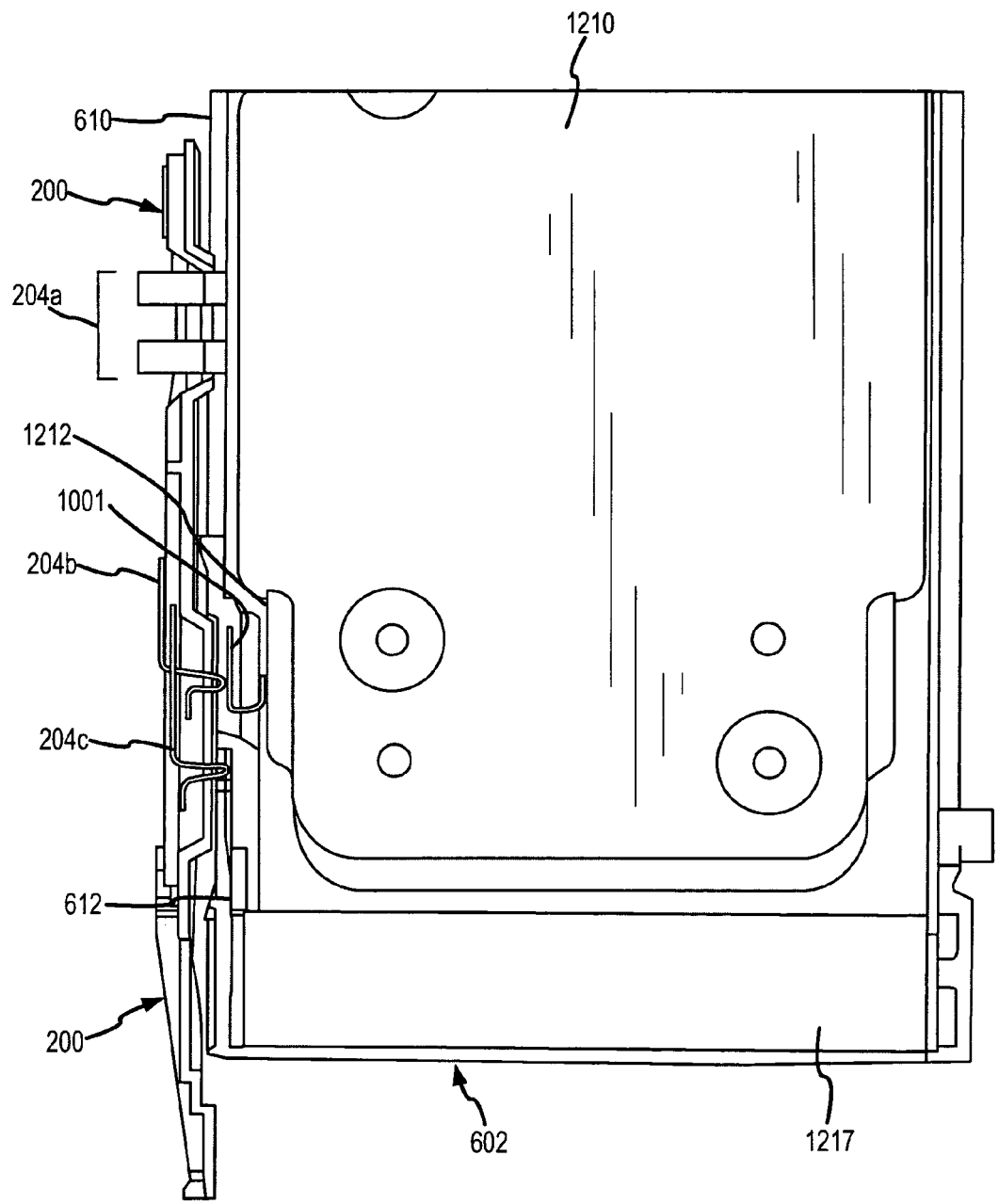
FIG. 13 is a side view of the electrical supply pad and the electrostatic precipitator cell according to an embodiment of the invention.

FIG. 13 is a side view of the electrical supply pad 200 and the electrostatic precipitator cell 602 according to an embodiment of the invention. This figure also shows the precipitator contact plate 1001, wherein it can be seen that the precipitator contact plate 1001 extends between and provides an electrical conductor path between the precipitator electrical contact 204*b* and the plurality of charge plates 1212. The ground electrical contact 204*a* contacts the ground conductor region 610, while the pre-ionizer electrical contact 204*c* contacts the pre-ionizer conductor region 612.

The air cleaner conductor system according the invention can be implemented according to any of the embodiments in order to obtain several advantages, if desired. The invention provides an air cleaner conductor system that reliably provides electricity to an electrostatic precipitator assembly. The invention provides an air cleaner conductor system that minimizes arcing between components. The invention provides conductor regions on a rear surface of an electrostatic precipitator assembly. The invention provides an air cleaner conductor system that establishes contact with the electrostatic precipitator assembly when the electrostatic precipitator assembly is fully inserted into an electrostatic precipitator receptacle. The invention provides an air cleaner conductor system that minimizes human contact probability. The invention provides an air cleaner conductor system that breaks electrical contact substantially upon initiation of removal of the electrostatic precipitator assembly.

What is claimed is:

1. An air cleaner conductor system, comprising:
   an electrostatic precipitator assembly;
   a chassis including an electrostatic precipitator receptacle and a power supply; and
   two or more electrical contacts located in the electrostatic precipitator receptacle and coupled to the power supply, with the two or more electrical contacts extending at least partially into the electrostatic precipitator receptacle,
   wherein the electrostatic precipitator assembly comes into contact with the two or mote electrical contacts when the electrostatic precipitator assembly is substantially fully inserted into position in the electrostatic precipitator receptacle, with the electrostatic precipitator receptacle including one or more sidewalls, an opening, and a back surface opposite the opening, and with the two or more electrical contacts being located on the back surface of the electrostatic precipitator receptacle.

2. The air cleaner conductor system of claim 1, with the two or more electrical contacts comprising three or more electrical contacts.

3. The air cleaner conductor system of claim 1, with the two or more electrical contacts including a ground electrical contact comprising two or more legs.

4. The air cleaner conductor system of claim 1, with the opening of the electrostatic precipitator receptacle being located in a front of the air cleaner.

5. The air cleaner conductor system of claim 1, with the electrostatic precipitator assembly further comprising one or more retainer devices that removably affix the electrostatic precipitator assembly in the electrostatic precipitator receptacle.

6. The air cleaner conductor system of claim 1, with the electrostatic precipitator assembly further comprising one or more rotatable retainer devices that removably affix the electrostatic precipitator assembly in the electrostatic precipitator receptacle.

7. The air cleaner conductor system of claim 1, with the electrostatic precipitator assembly further comprising one or more rotatable retainer devices that removably affix the electrostatic precipitator assembly in the electrostatic precipitator receptacle, wherein a retainer device comprises a handle portion and a substantially arcuate wedge portion.

8. The air cleaner conductor system of claim 1, with the electrostatic precipitator assembly further comprising two or more side surfaces, a front side including a handle, a back side opposite the front side, and two or more conductor regions on the back side, with the two or more conductor regions comprising a ground conductor region and a precipitator voltage conductor region.

9. The air cleaner conductor system of claim 8, with the two or more conductor regions including a precipitator contact plate, with the precipitator contact plate comprising:
   the precipitator voltage conductor region, with the precipitator voltage conductor region being substantially planar;
   a cell contact portion; and
   a through portion connecting the precipitator voltage conductor region and the cell contact portion, with the through portion extending through a side surface of the electrostatic precipitator assembly;
   wherein the precipitator voltage conductor region is contacted by a precipitator electrical contact of the two or more electrical contacts and the cell contact portion contacts one or more charge plates of the electrostatic precipitator assembly.

10. The air cleaner conductor system of claim 1, with the two or more electrical contacts further comprising three or more electrical contacts and with the electrostatic precipitator assembly further comprising two or more side surfaces, a front side including a handle, a back side opposite the front side, and three or more contact regions on the back side, with the three or more contact regions comprising a ground conductor region, a precipitator voltage conductor region, and a pre-ionizer voltage conductor region.

11. The air cleaner conductor system of claim 1, further comprising:
   an electrical supply pad retained in the electrostatic precipitator receptacle at a predetermined location, with the two or more electrical contacts being held in the electrical supply pad and extending at least partially from the electrical supply pad and into the electrostatic precipitator receptacle; and
   a wiring harness extending to the electrical supply pad, with two or more corresponding wires of the wiring harness coupling the two or more electrical contacts to the power supply.

12. The air cleaner conductor system of claim 11, with the electrical supply pad further comprising a wiring channel that accepts the wiring harness.

13. The air cleaner conductor system of claim 11, with the electrical supply pad further comprising a wiring channel that accepts the wiring harness, with the wiring channel including two channel portions and wherein a first channel portion receives low voltage wires and a second channel portion receives high voltage wires.

14. An air cleaner conductor system, comprising:
an electrostatic precipitator assembly including a pre-ionizer;
a chassis including an electrostatic precipitator receptacle and a power supply; and
three or more electrical contacts located in the electrostatic precipitator receptacle and coupled to the power supply, with the three or more electrical contacts extending at least partially into the electrostatic precipitator receptacle,
wherein the electrostatic precipitator assembly comes into contact with the three or more electrical contacts when the electrostatic precipitator assembly is substantially fully inserted into position in the electrostatic precipitator receptacle, with the electrostatic precipitator receptacle including one or more sidewalls, an opening, and a back surface opposite the opening and with the three or more electrical contacts being located on the back surface of the electrostatic precipitator receptacle.

15. The air cleaner conductor system of claim 14, with the three or more electrical contacts including a ground electrical contact comprising two or more legs.

16. The air cleaner conductor system of claim 14, with the opening of the electrostatic precipitator receptacle being located in a front of the air cleaner.

17. The air cleaner conductor system of claim 14, with the electrostatic precipitator assembly further comprising one or more retainer devices that removably affix the electrostatic precipitator assembly in the electrostatic precipitator receptacle.

18. The air cleaner conductor system of claim 14, with the electrostatic precipitator assembly further comprising one or more rotatable retainer devices that removably affix the electrostatic precipitator assembly in the electrostatic precipitator receptacle.

19. The air cleaner conductor system of claim 14, with the electrostatic precipitator assembly further comprising one or more rotatable retainer devices that removably affix the electrostatic precipitator assembly in the electrostatic precipitator receptacle, wherein a retainer device comprises a handle portion and a substantially arcuate wedge portion.

20. The air cleaner conductor system of claim 14, with the electrostatic precipitator assembly further comprising two or more side surfaces, a front side including a handle, a back side opposite the front side, and three or more conductor regions on the back side, with the three or more conductor regions comprising a ground conductor region, a precipitator voltage conductor region, and a pre-ionizer voltage conductor region.

21. The air cleaner conductor system of claim 20, with the three or more conductor regions including a precipitator contact plate, with the precipitator contact plate comprising:
the precipitator voltage conductor region, with the precipitator voltage conductor region being substantially planar;
a cell contact portion; and
a through portion connecting the precipitator voltage conductor region and the cell contact portion, with the through portion extending through a side surface of the electrostatic precipitator assembly;
wherein the precipitator voltage conductor region is contacted by a precipitator electrical contact of the three or more electrical contacts and the cell contact portion contacts one or more charge plates of the electrostatic precipitator assembly.

22. The air cleaner conductor system of claim 14, further comprising:
an electrical supply pad retained in the electrostatic precipitator receptacle at a predetermined location, with the three or more electrical contacts being held in the electrical supply pad and extending at least partially from the electrical supply pad and into the electrostatic precipitator receptacle; and
a wiring harness extending to the electrical supply pad, with three or more corresponding wires of the wiring harness coupling the three or more electrical contacts to the power supply.

23. The air cleaner conductor system of claim 22, with the electrical supply pad further comprising a wiring channel that accepts the wiring harness.

24. The air cleaner conductor system of claim 22, with the electrical supply pad further comprising a wiring channel that accepts the wiring harness, with the wiring channel including two channel portions and wherein a first channel portion receives low voltage wires and a second channel portion receives high voltage wires.

25. An air cleaner conductor system, comprising:
an electrostatic precipitator assembly comprising two or more conductor regions;
a chassis including an electrostatic precipitator receptacle and a power supply, with the electrostatic precipitator receptacle including one or more sidewalls, an opening, and a back surface opposite the opening;
an electrical supply pad, with the electrical supply pad retained in the electrostatic precipitator receptacle at a predetermined location on the back surface;
two or more electrical contacts held in the electrical supply pad and extending at least partially from the electrical supply pad and into the electrostatic precipitator receptacle,
wherein the two or more conductor regions of the electrostatic precipitator assembly come into contact with the two or more electrical contacts when the electrostatic precipitator assembly is substantially fully inserted into position in the electrostatic precipitator receptacle; and
a wiring harness extending to the electrical supply pad, with two or more corresponding wires of the wiring harness coupling the two or more electrical contacts to the power supply,
and with the two or more electrical contacts being located on the back surface of the electrostatic precipitator receptacle.

26. The air cleaner conductor system of claim 25, with the two or more electrical contacts comprising three or more electrical contacts.

27. The air cleaner conductor system of claim 25, with the two or more electrical contacts including a ground electrical contact comprising two or more legs.

28. The air cleaner conductor system of claim 25, with the electrostatic precipitator assembly further comprising one or more retainer devices that removably affix the electrostatic precipitator assembly in the electrostatic precipitator receptacle.

29. The air cleaner conductor system of claim 25, with the electrostatic precipitator assembly further comprising one or more rotatable retainer devices that removably affix the electrostatic precipitator assembly in the electrostatic precipitator receptacle.

30. The air cleaner conductor system of claim 25, with the electrostatic precipitator assembly further comprising one or more rotatable retainer devices that removably affix the electrostatic precipitator assembly in the electrostatic precipitator receptacle, wherein a retainer device comprises a handle portion and a substantially arcuate wedge portion.

31. The air cleaner conductor system of claim 25, with the electrostatic precipitator assembly further comprising two or more side surfaces, a front side including a handle, a back side opposite the front side, with the two or more conductor regions being located on the back side and comprising a ground conductor region and a precipitator voltage conductor region.

32. The air cleaner conductor system of claim 31, with the two or more conductor regions including a precipitator contact plate, with the precipitator contact plate comprising:
   the precipitator voltage conductor region, with the precipitator voltage conductor region being substantially planar;
   a cell contact portion; and
   a through portion connecting the precipitator voltage conductor region and the cell contact portion, with the though portion extending through a side surface of the electrostatic precipitator assembly;
   wherein the precipitator voltage conductor region is contacted by a precipitator electrical contact of the two or more electrical contacts and the cell contact portion contacts or more charge plates of the electrostatic precipitator assembly.

33. The air cleaner conductor system of claim 25, with the two or more electrical contacts further comprising three or more electrical contacts and with the electrostatic precipitator assembly further comprising two or more side surfaces, a front side including a handle, a back side opposite the front side, and three or more conductor regions being located on the back side, with the three or more conductor regions comprising a ground conductor region, a precipitator voltage conductor region, and a pre-ionizer voltage conductor region.

34. The air cleaner conductor system of claim 25, with the electrical supply pad further comprising a wiring channel that accepts the wiring harness.

35. The air cleaner conductor system of claim 25, with the electrical supply pad further comprising a wiring channel that accepts the wiring harness, with the wiring channel including two channel portions and wherein a first channel portion receives low voltage wires and a second channel portion receives high voltage wires.

36. The air cleaner conductor system of claim 25, with the opening of the electrostatic precipitator receptacle being located in a front of the air cleaner.

* * * * *

UNITED STATES PATENT AND TRADEMARK OFFICE
CERTIFICATE OF CORRECTION

PATENT NO.        : 7,547,352 B2
APPLICATION NO.   : 11/499595
DATED             : June 16, 2009
INVENTOR(S)       : Paterson et al.

It is certified that error appears in the above-identified patent and that said Letters Patent is hereby corrected as shown below:

Title Page:
Item (56), References Cited, U.S. PATENT DOCUMENTS, change "3,237,363" to -- 3,237,383 --. The reference will then correctly appear as "3,237,383 A   3/1966 Gilbertson".

Column 11:
Line 17 (claim 32, line 10), before "portion extending", change "though" to -- through --.

Signed and Sealed this

Twenty-second Day of December, 2009

David J. Kappos
*Director of the United States Patent and Trademark Office*